US012636806B2

(12) United States Patent　　　　　(10) Patent No.: US 12,636,806 B2

Irigoite et al.　　　　　　　　　　　　(45) Date of Patent: May 26, 2026

(54) SYSTEM AND METHOD FOR AUTOMATED PARAMETRIZATION OF A VIBRATING KNIFE MULTI-PLY CUTTING MACHINE

(71) Applicant: AUDACES AUTOMAÇÃO E INFORMÁTICA INDUSTRIAL LTDA, Florianópolis (BR)

(72) Inventors: Adriano Mansur Irigoite, Florianópolis (BR); Magner Steffens, São José (BR); Roni Anderson Lessa, São José (BR); André Pavilionis, Florianópolis (BR); Eduardo Neves da Rocha, Florianópolis (BR)

( * ) Notice: Subject to any disclaimer, the term of this patent is extended or adjusted under 35 U.S.C. 154(b) by 74 days.

(21) Appl. No.: 18/020,001

(22) PCT Filed: Jun. 2, 2021

(86) PCT No.: PCT/BR2021/050239

§ 371 (c)(1),
(2) Date: Feb. 6, 2023

(87) PCT Pub. No.: WO2022/032365

PCT Pub. Date: Feb. 17, 2022

(65) Prior Publication Data

US 2025/0381700 A1　　Dec. 18, 2025

(30) Foreign Application Priority Data

Aug. 13, 2020　(BR) .......................... 102020016482-1

(51) Int. Cl.
B26D 5/00　　　(2006.01)
B26D 1/06　　　(2006.01)
(Continued)

(52) U.S. Cl.
CPC ......... B26D 5/005 (2013.01); G05B 13/0265 (2013.01); G05B 19/05 (2013.01);
(Continued)

(58) Field of Classification Search
CPC ........ G05B 19/05; G05B 19/18; G05B 19/19; G05B 19/404; G05B 13/0265;
(Continued)

(56) References Cited

U.S. PATENT DOCUMENTS 4,133,235 A * 1/1979 Gerber ................... B26D 5/005
　　　　　　　　　　　　　　　　　　　　83/756
4,327,615 A * 5/1982 Gerber ..................... B26D 5/00
　　　　　　　　　　　　　　　　　　　　83/753

(Continued)

FOREIGN PATENT DOCUMENTS

EP　　　　0768045 B1 * 1/2000 ............. B26D 5/005

*Primary Examiner* — Ronald D Hartman, Jr.
(74) *Attorney, Agent, or Firm* — Donald J. Ersler

(57) ABSTRACT

A system for automated parametrization of a vibrating knife multi-ply cutting machine provided with programmable logical controller (PLC) is described, the system comprising, coupled to the vibrating knife (L): (i) a LVDT sensor (H) for the measurement of the knife linear displacement and of the cutting rate; (ii) a linear potentiometer sensor (F) for the measurement of the spread height; and (iii) a through-beam photoelectric sensor (G) for determining the knife (L) width; and where said PLC comprises an artificial intelligence for receiving and processing said data from said sensors (i), (ii) and (iii) and for performing the automatic cutting parametrization (D). The method which utilizes the system of the invention is also described.

7 Claims, 4 Drawing Sheets

(51) Int. Cl.
     *D06H 7/00*           (2006.01)
     *G05B 13/02*       (2006.01)
     *G05B 19/05*       (2006.01)
     *G05B 19/19*       (2006.01)

(52) U.S. Cl.
     CPC ................. *B26D 1/06* (2013.01); *D06H 7/00*
            (2013.01); *G05B 19/19* (2013.01)

(58) Field of Classification Search
     CPC ........ G05B 19/4097; B26D 1/06; B26D 5/00;
                  B26D 7/00; B26D 7/08; D06H 7/00;
                                    D06H 7/02
     USPC ........................................................ 700/134
     See application file for complete search history.

(56) References Cited

U.S. PATENT DOCUMENTS

| | | | | | |
|---|---|---|---|---|---|
| 4,434,691 | A | * | 3/1984 | LeBlond | ............... B26F 1/3813 83/56 |
| 4,512,839 | A | * | 4/1985 | Gerber | ................. B26F 1/3806 83/881 |
| 4,596,171 | A | * | 6/1986 | Gerber | .................. B26D 7/086 83/749 |
| 4,732,064 | A | * | 3/1988 | Pearl | ....................... B24B 3/361 76/82 |
| 5,573,442 | A | * | 11/1996 | Morita | ................. G05B 19/404 83/62.1 |
| 5,825,652 | A | * | 10/1998 | LeBlond | ............... B26F 1/3813 81/463 |
| 6,131,498 | A | * | 10/2000 | Gerber | ................... B26F 1/382 83/647 |

\* cited by examiner

FIG. 4
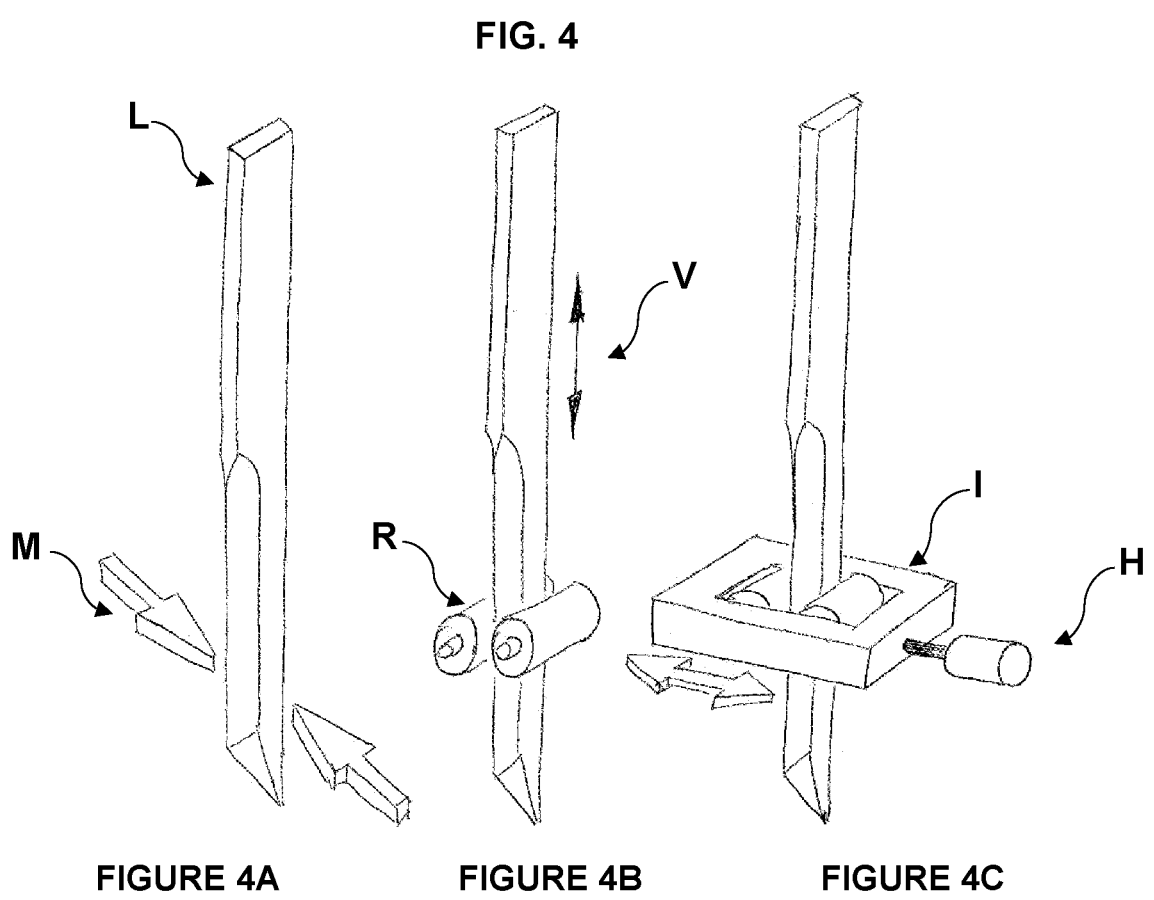
FIGURE 4A          FIGURE 4B          FIGURE 4C
FIG. 5
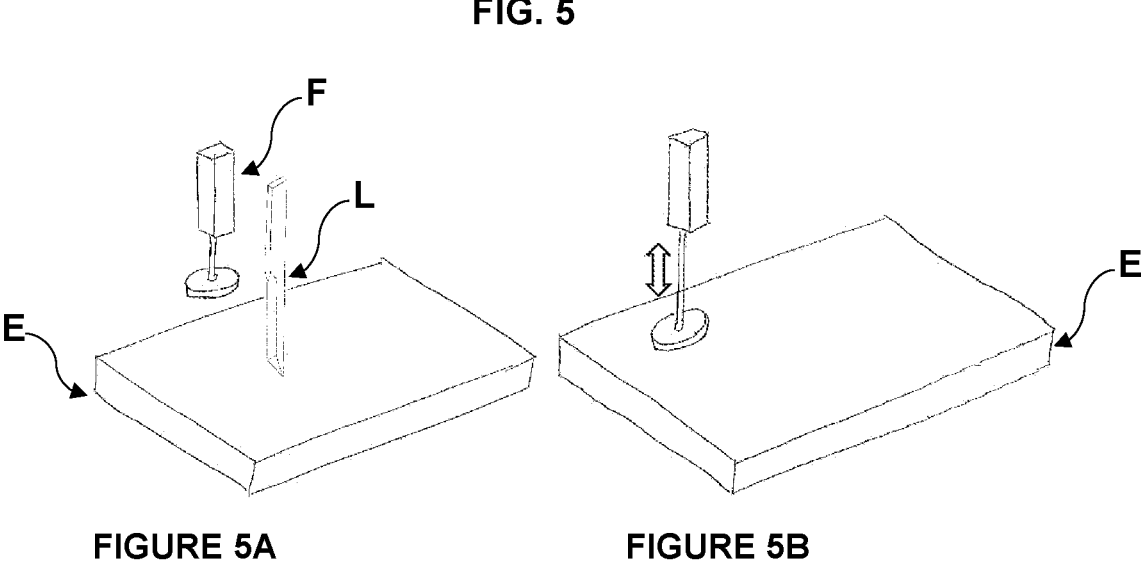
FIGURE 5A                    FIGURE 5B

FIG. 6
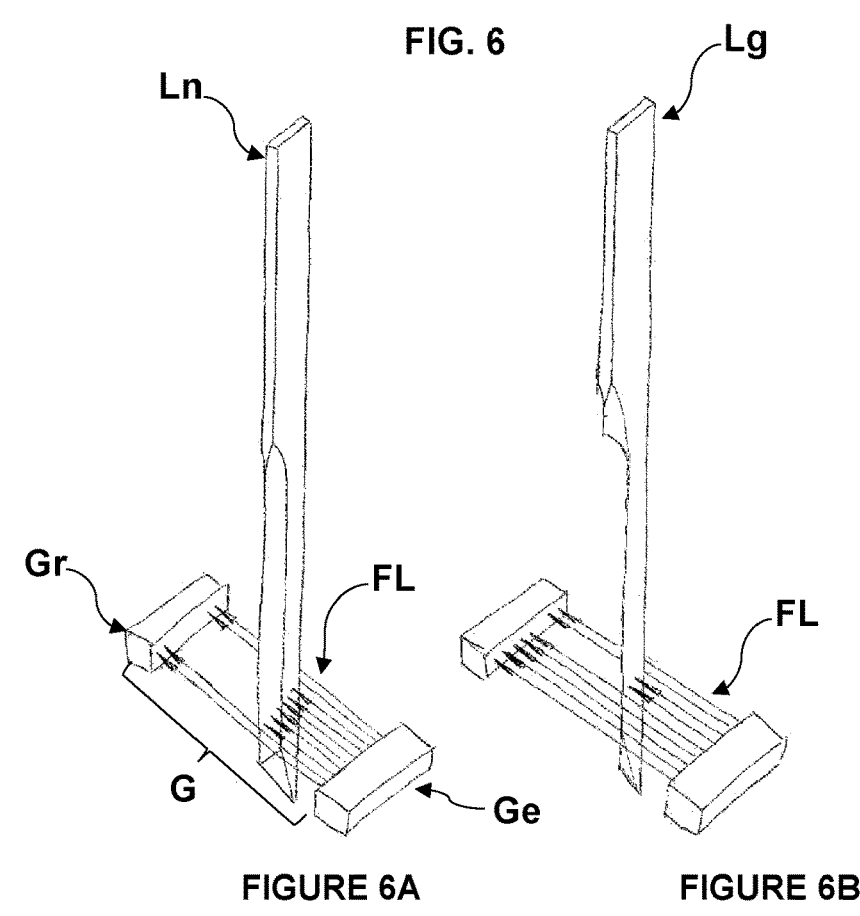
FIGURE 6A          FIGURE 6B
FIG. 7
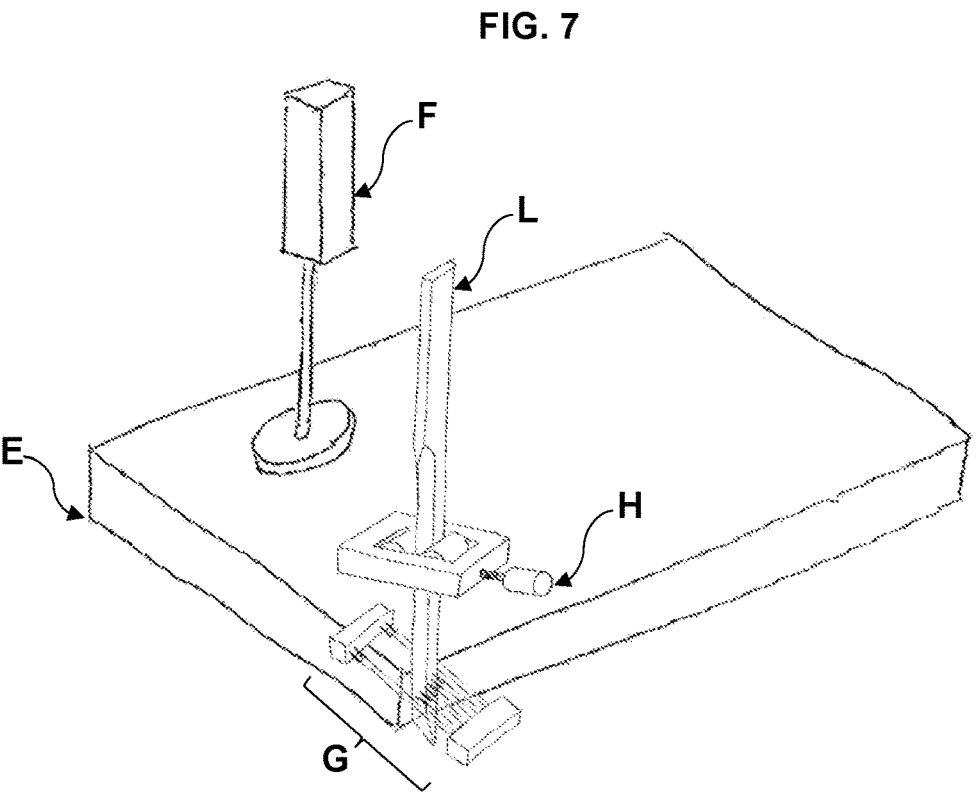

SYSTEM AND METHOD FOR AUTOMATED PARAMETRIZATION OF A VIBRATING KNIFE MULTI-PLY CUTTING MACHINE

TECHNICAL FIELD

The present invention belongs to the technical field of cutting machines, more specifically, to a system and method for the automated parametrization of a vibrating knife multi-ply cutting machine based on sensors coupled to the vibrating knife where the logical programmer of said vibrating knife cutting machine includes a built-in artificial intelligence algorithm in order to pre-establish the cutting parameters.

BACKGROUND INFORMATION

Textile industry comprises several segments, such as fiber production, spinning, knit and woven fabric, and apparel. Each of these segments exhibits specificities related to raw material, technology and market see the report published by the Brazilian Association of Machines and Equipment. The History of Machines. Abimaq 70 years. São Paulo, BR, ABIMAQ 2006.

In the segment of apparel, specifically, cutting is one of the main production activities, being responsible for the transformation of raw materials into a finished product. Whenever ill planned or executed, it can jeopardize the quality and progress both of the manufacturer and the product itself.

With the advances in technology, sophisticated cutting machines were developed, which allow up to 80% increase in the textile industry production. Among these machines are highlighted the disc single-ply automatic cutting machine and the vibrating knife multi-ply automatic cutting machine. These machines receive the command for cutting the pieces designed in a CAD (Computer Aided Design) system and thus execute the production batches of an apparel see Silva, C. E. e Ribeiro, F. A.: Estudo comparativo entre sistema de corte convencional e automático. 2010. 24 f. Pesquisa (Técnico em Calçados)—Curso Técnico em Calçados do SENAI, Birigui, S P. The CAD system forwards the patterns to be cut as well as the cutting parameters (data such as the blade movement speed, vibration speed, presser foot pressure, etc. which should be described in the system by the user) to the programmable logical controller (PLC), it being considered the machine brain. Based on the data received, the controller coordinates the cutting done in the fabric by the knife.

Conversely, knifes of machines for cutting spread should be made of materials having hardness higher than that of the fabric to be cut, that is why they are manufactured in carbon steel or alloys like tungsten (W), cobalt (Co), chrome (Cr), Vanadium (Va), molybdenum (Mo) and Boron (B), providing them with improved wear resistance, higher cutting speed and better sharpening, see the book by Ferraresi, D. Fundamentos da usinagem dos metais. v. 1. São Paulo: E d. E. Blucher, 1970.

The so-called vibrating knife, multi-ply automated cutting machines, object of this research, are used to execute high production volumes, working simultaneously on multiple fabric plies (the so-called spreads) to extract an "x" number of pieces per each cut. However, the higher the number of plies of the spread, the denser it is going to be, which generally causes deflection of the moving knife when it contacts the fabric to be cut, as illustrated in attached FIGS. 1 and 2. FIG. 1 represents what is expected at the moment of the cutting: that the knife (L) vertically cuts spread (E).

On the account of the fabric density, however, what really happens is what is illustrated in FIG. 2, the knife deflection, that is, the cutting is executed with some degree of slope: when the knife moves (M) towards the right, it deflects towards the left, and vice-versa. The higher the fabric density, the higher the moving knife deflection, which results in production of pieces that are different in geometry and size, from the first to the last ply cut at that event. Such differences are sources of drawbacks in the quality of the apparel. Knife deflection is, therefore, a technical problem which interferes in the execution of maximum efficiency, high-quality cutting, which impacts the maximization of resources and the quality of the final manufactured apparel.

The inequality among the cut items occurs because the fabric exerts pressure on the cutting tool (the knife), which flexes. In the absence of an automated control system to prevent deflection the cutting machine operator is unable to avoid this drawback since the knife is positioned inside the spread and cannot be seen during the process—the problem is detected only at the end, when the items are unequally cut. What is usually done in this case is in a later cut, to reduce the cutting machine speed and/or reduce the number of plies of the spread to maximally avoid this drawback in the cutting production. Reducing cutting speed or number of spread plies, however, implies in reduction of number of items produced at each cutting, resulting in low production and low apparel efficiency.

Different studies focused on minimizing this drawback, developing solutions to avoid knife deflection without reducing production quality and quantity. This is the case of patents including patent documents EP0644022 and GB2094031. In these works, the cutting working system compares the cutting force based on parameters configured by the user with the real force exerted by the machine, adjusting and (re)calculating during the process. Thus, the cited patents offer solutions for the deflection problem by working on adjustments on the cutting path as a function of sensors aggregated to the knife. Notwithstanding, these solutions require high skills of the machine operator, who should configure the spread (fabric plies) cutting parameters.

It is thus imperative to find the variables which most influence the knife deflection and design a new cutting system to make the tool to undergo the lowest possible deflection during cutting and that has the maximum sensitivity to pre-define the cutting parameters, without depending on the expertise of the machine user. For this purpose the cutting control system of a vibrating knife multi-ply automated cutting machine was improved with the aid of several sensors which could measure the cutting tool deflection and, on the basis of the measurement, acting on the parameters which mostly cause such drawbacks to the machine.

The relevance of the research performed by the Applicant technical staff and which led to the present Application lies in the knowledge of the flexural behavior of the tool on the fabric, as well as on the automated reprogramming of the equipment—automated parametrization—to obtain high productivity with quality.

The development of the research which led to the present Application is based on the various possibilities offered by several sensors which can measure the cutting knife deflection as well as the density and the height of the material to be cut so that on the basis of these measurements it is possible to act on the process-defining parameters and define ideal values for same. That is how maximum accuracy cuttings are obtained without the operator interference.

In short, the system of the invention enables re (calculating) the parameters before launching the cutting, freeing the user from the responsibility of configuring same.

SUMMARY OF THE INVENTION

Broadly, the system of the invention for the automated parametrization of a vibrating knife automated multi-ply cutting machine provided with a programmable logical control (PLC) comprises:

a) coupled to the vibrating knife: i) a LVDT (Linear Variable Differential Transformer) (H), for performing the measurement of a linear displacement of the knife and of the cutting speed; ii) a linear potentiometer sensor (F) to measure the spread height; and (iii) a through-beam photoelectric sensor (G) for the calculation of the knife width, this parameter being relevant for calculating the deflection effect; and b) where said PLC comprises an algorithm for processing data received by sensors of i), ii) and iii).

According to the present system, the artificial intelligence is based on a suitable movement method of the knife within the spread.

And the automated parametrization method for a vibrating knife multi-ply cutting machine provided with a computer with a CAD system and PLC logical programmer using the system of the invention comprises the following steps:

a) Step 1: the computer (A) provided with a CAD system conveys the commands for collecting data of the spread to be cut to the PLC provided with an algorithm (C);

b) Steps 2, 4 and 6: the cutting machine engines, controlled by the algorithm (C), work to make the knife penetrate the fabric plies (spread), starting the routine;

c) Steps 3,5 and 7: the knife sensors (H), (F) and (G) convey the signals read to the PLC provided with algorithm (C) and the PLC by means of the algorithm (C) defines the cutting parameters (D); and d) Step 8: said cutting parameters are conveyed to computer (A) provided with a CAD system.

Therefore, the system of the present invention provides, for the automated parametrization of a vibrating knife cutting machine provided with a CAD computer with PLC, a combination of sensors coupled to said knife to grab the cutting parameters: linear displacement of the knife and the cutting speed, spread height measurement; and knife width and an algorithm incorporated to said PLC for processing and parametrization of the data received from said sensors.

The invention provides further a method for the automated parametrization for processing data obtained by the sensors coupled to said vibrating knife, the data being conveyed to said PLC, processed by the built-in algorithm, the cutting parameters being determined and executed in an automated manner.

The invention provides further a system and method for the automated parametrization of vibrating knife cutting machines enabling great accuracy in the spread cutting, avoiding drawbacks resulting from decisions made by manual operators.

BRIEF DESCRIPTION OF THE DRAWINGS

FIG. 4 is the deflection sensor connected to the cutting knife.

FIG. 5 is the height sensor working on the spread.

FIG. 6 is the cutting knife width sensor connected to the tool.

FIG. 7 is how the sensors of FIGS. 4, 5 and 6 are positioned on the cutting knife.

DETAILED DESCRIPTION OF THE INVENTION

Figure 1:
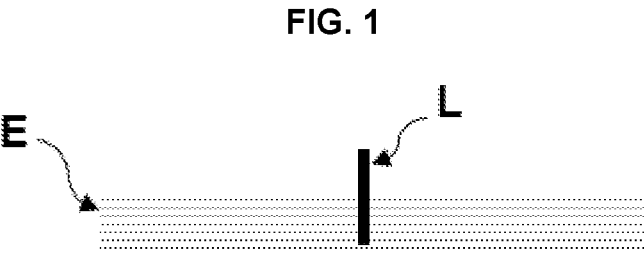
FIG. 1 represents the ideal expected from a cutting knife in a multi-ply fabric.
Figure 2:
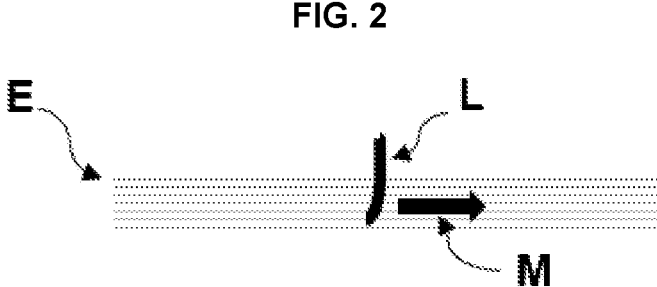
FIG. 2 represents the reality, in this case, the cutting knife deflection, as seen in state-of-the-art equipment.

One objective of the invention is an automated parametrization system for vibrating knife multi-ply cutting machine.

A further objective is the method for automated parametrization for vibrating knife multi-ply cutting machine using the system of the invention.

The system of the invention comprises, for a vibrating knife (L) multi-ply cutting machine provided with a Programmable Logical Controller (PLC): coupled to said vibrating knife (L), (i), at least one LVDT (Linear Variable Differential Transformer) sensor (H) for the measurement of a linear displacement of said knife (L); at least one linear potentiometer sensor (F) for measuring the height of the spread; and (iii) at least one sensor (G) for determining the knife (L) width; and, built-in in the Programmable Logical Controller, an artificial intelligence for receiving and processing data received from said (H), (F) and (G) sensors for performing the automated parametrization without human interference.

Sensors (H), (F) and (G) utilized in the present system and method are commercial devices and as such do not constitute an object of the invention. Thus, different brands and models of these sensors are useful for the purposes of the invention, in agreement with the kind of machine/knife to which they will be coupled.

The cutting machines to which the present system and method can be applied include varied cutting machines, but more specifically vibrating knife multi-ply cutting machines. These machines can cut fabric, including from silk to Denim and other fabrics, of different thicknesses, plastic materials, boards, varied papers, etc. Therefore, although the invention is mainly directed to the cutting of spreads (fabrics) in vibrating knife multi-ply machines, they can also be adapted without much difficulty for cutting these other materials, and therefore it is not limited to cutting spread arranged in multi-plies.

The characterization of the present invention is performed by means of schematic, attached Figures, representing the proposed control system, so that the product can be completely reproduced by a suitable technique, enabling the full characterization of the functionality of the claimed object.

The attached Figures express the best mode or the preferred mode of performing the object of the invention while the description of the specification is substantiated by means of a consecutive, detailed numbering, for clarifying aspects which could be misunderstood by the adopted representation, to unequivocally determine the intended protection.

It should be understood by the experts that the attached Figures are merely illustrative, variations being possible, all being comprised within the scope of the invention.

According to the present specification, the present invention describes a novel system which comprises both the sensors present on the knife and the artificial intelligence present in the machine PLC. The artificial intelligence is based on a method of suitable displacement of the knife within the spread, in order to extract the maximum information from the sensors and, through response patterns, to understand the kind of spread to be cut.

Figure 3:
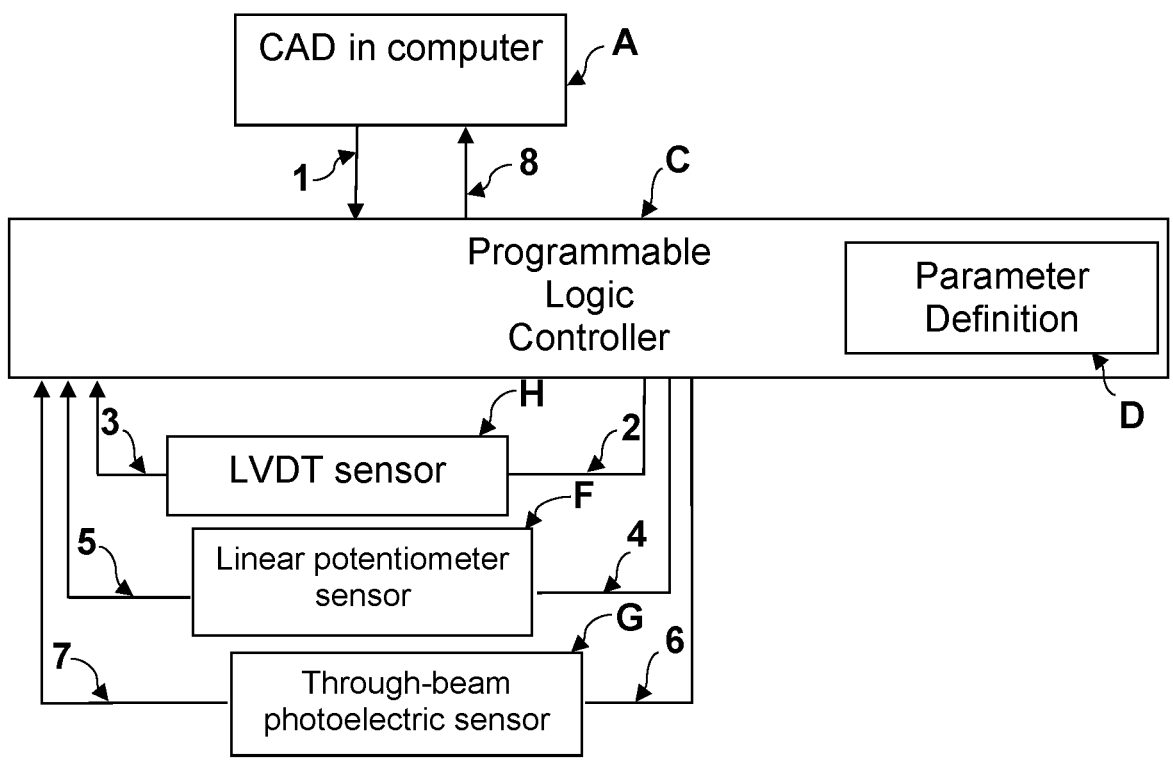
FIG. 3 is a schematic representing the methodology of the automated parametrization system of the invention.

In order to detail the automated parametrization method for vibrating knife multi-ply cutting machine which utilizes the system of the invention, FIG. 3 is a flow sheet with the cutting process steps numbered from 1 to 8.

According to the illustration of FIG. 3, the automated parametrization method according to the invention starts (step 1) when the computer provided with a CAD (A) conveys to the PLC (C) the commands for collecting data of the spread to be cut. Then, the equipment engines, controlled by the built-in algorithm (C) in the PLC work to make the knife penetrate the fabric plies (spread), launching the routine execution (steps 2, 4 and 6), where sensors (H), (F) and (G), coupled to the knife, convey the read signals (steps 3, 5 and 7) to the PLC (C). Finally, controller (C) with the built-in artificial intelligence, performs the definition of cutting parameters (D) and convey same (step 8) to computer CAD (A).

According to this method the following sensing is used:

The LVDT (Linear Variable Differential Transformer) sensor (H) measures a linear displacement of the knife. The working of the LVDT sensor in the system of the invention is detailed in attached FIG. 4, where it is possible to view that, when there is a force (M) being exerted on the lateral side of knife (L) (FIG. 4A) rollers (R) (FIG. 4B) secure that knife (L) continues to perform its vibration (V), moving also upwards and downwards in the fabric cutting. Sheath (I) (FIG. 4C) which also wraps rollers (R) (FIG. 4B) enables the connection of sensor (H) which captures the deflection movement.

As relates to sensor (H), the inner side of same is based on three reels and a cylindrical, ferromagnetic core. The output signal is proportional do the core displacement, that is, to the linear displacement which should be attached or in contact with what should be measured.

The linear potentiometer sensor (F) which measures the height of the spread is illustrated in FIG. 5. According to FIG. 5A, this sensor is positioned parallel to cutting knife (L) and, when the knife drops on the spread (E), (FIG. 5B), sensor (F) automatically also drops and right away measures the height of the material to be cut. Thus, in view of the fact that a 1 mm-measurement error is viable, sensor (F) is a variable linear potentiometer exhibiting acceptable accuracy.

Considering that in order to better perform the fabric cutting the knife should be routinely sharpened, with removal of knife material, rendering it less resistant. Thus, it is important to associate a through-beam photoelectric sensor (G) to knife (L) to estimate the knife (L) width, since the thinnest the knife (L), the more it undergoes the deflection effect.

In through-beam photoelectric sensors, also known as opposed mode sensors, transmitter and emitter are in separate housings. The light emitted by the emitter is aimed directly at the receiver. When an object breaks the light beam between the emitter and the receiver, the receiver output changes of state.

The working of sensor (G) can be viewed in FIG. 6, which depicts a through-beam photoelectric sensor (G) where the arrows signal the light beams (FL) that exit the emitter module (Ge) towards the receiver module (Gr), crossing the tool. A new knife (Ln) (FIG. 6A) blocks a higher amount of light beams; while a worn knife (Lg) (FIG. 6B) blocks less, allowing more beams. In this way, sensor (G) enables the identification of the wear undergone by the knife through sharpening and its consequent reduction in width: the thinner the knife, the more light beams cross the same and reach the receiver module (Gr) which in turn informs the artificial intelligence built-in in the PLC the new dimension of knife (L).

The relationship between (H, F and G) sensors in the system aims at integrating the most relevant factors as cutting parameters. To this end, they provide the following data to the algorithm:

the spread height, as measured by sensor (F), which provides the density evaluation of the material to be cut;

the knife width, as measured by sensor (G), this being a feature of the cutting tool—the thinnest the knife, the more it deflects and the higher the risk of failure caused by fragility;

the tool vibration rate, as measured by sensor (H), confers cutting power to the tool—for more vibration, more times the cutting portion crosses the same location of the fabric, and more fabric meshes are cut, with lesser knife deflection; and the cutting speed, also measured by sensor (H)—the higher the shafts moving speed for cutting the higher the production, however with lesser quality resulting from the higher knife deflection in the fabric.

In general terms, algorithm (C) receives the data mentioned above from the sensors, calculates the parameters and defines the fabric rigidity (step 8 of the present method) to afterwards set forth all the cutting parameters (D) for the machine to start cutting, conveying the command to the engines to launch cutting the fabric.

In this way, the resulting system, represented in the flow sheet of FIG. 3 succeeds, even before the start of the cutting process, by utilizing the sensors coupled to knife (L), in pre-defining and configuring the cutting parameters at the moment knife (L) enters the fabric plies and detects the kind of material to be cut, the need that the user previously defines said parameters on the CAD system being dispensed with.

Said detection, comprehending all the collected data is extremely important to the process since the existing diversity of fabrics implies in different physical behaviors. Cutting a Denim spread, for example, is similar to cutting wood, exhibiting much more knife deflection than with a knitted fabric even for spreads of similar height and/or weight, and each one operating with distinct cutting parameters to obtain efficiency and quality. Therefore it is not only the spread height that is responsible for the knife deflection; the density of the material to be cut also depends on the kind of fabric. And because of the diversity of fabrics, added to the variable of the number of plies to be cut, each arrangement implies in an ideal cutting parametrization to obtain quality and efficiency in the process, resulting, therefore, in such an amount of combinations that they require huge equipment instrumentation to obtain the better efficiency of same.

The novelty of the system object of the present Application lies exactly on the integration of the described sensors with the artificial intelligence (algorithm) that (re)calculates the parameters before launching the cutting, freeing the user from the responsibility of configuring them. Thus the invention enables going beyond the objective described in the state-of-the-art of just controlling knife deflection curing cutting, which was restricted to the control system for path correction, a subject already treated and disclosed in other patent documents such as EP0644022 and GB2094031.

In a patentably distinguishing way, the present invention refers to a system which, based on the spread height, stiffness of same and assessment of the cutting tool (knife)

dimension is able to define the kind of fabric to be cut even before performing the cutting, and hence the machine is self-parameterized to reach higher efficiency and high quality, while the operator does not need to have specific knowledge of the fabric to be cut nor a high degree of empirical experience on the cutting process.

In this way, the presented system acts before the cutting (FIG. 3) when it performs the process in which the machine operator needs only to select the design he wants to cut since, by means of sensors (LVDT, linear potentiometer sensor and sensor for determining the knife dimension) it performs a routine on the fabric to detect its kind based on the amount of same, and then, assesses and modifies the machine parameters in the best way, thus making the knife to follow its path in the material in a more accurate way. It is stressed here that the operator expertise is no longer needed since the system by itself automatically detects the kind of material to be cut.

During the cutting, the system makes use of a cutter to control the knife and, in case the same deviates from the desired path, the system works to correct it during the process. Such correction occurs because the system sensors can capture the knife movement deviating from the path, calculate the parameters required for the correction to be applied to the knife and thus have it return to the right path as the cutting advances.

EXAMPLE

The present system was tested at first for cutting small spreads, to be able to relate what was being detected by sensors with the several kinds of fabrics and heights. For the study, a pattern was set forth, being cut in conformity with the experts in fabric cutting involved in the project, the cutter being forced to travel on curved paths, since the stronger deflection force is for this kind of path, thus, a curved shape was designed. For executing the test, a 50 mm-height for all spreads was standardized, and the program that monitors the force undergone by the knife was used without any path correction control being driven, since the purpose was to detect the force undergone by the knife.

Following this study an algorithm was implemented based on the "fabric stiffness" attribute and as such, the knife penetrated the material, captured the spread height and was then laterally displaced by 2 mm. On performing this movement, the fabric caused a force on the knife, deflecting it, and consequently, the fabric produced a force on the knife, deflecting it and consequently collecting a figure to rank the stiffness found. After this ranking the system altered the value of other necessary parameters such as cutting rate, vibration rate and sharpening amount to obtain a better quality cutting at the maximum possible rate and economy.

By applying the present system to the cutting machine a knowledgeable, experienced technical staff able to understand the specificity of every fabric and parameterize the multi-ply cutting machine to reach the desired quality was no longer needed; the developed system based on detection has sufficient intelligence to achieve a cutting of higher productivity and quality. In this way, it is possible to completely remove the responsibility of the operator and thus reach the control of quality desired for apparel with credibility.

The invention claimed is:

1. A system for automated parameterization of a multi-ply, vibrating knife cutting machine, equipped with a programmable logic controller (PLC), wherein the system comprises:

a) an LVDT sensor coupled to the vibrating knife and configured to (1) measure linear displacement of the vibrating knife and to (2) derive a cutting rate;

b) a linear potentiometer sensor configured to measure a material spread height; and c) a through-beam photoelectric sensor configured to output a signal indicative of a knife width, the knife width being used to determine a deflection of the vibrating knife, wherein the PLC is programmed with an algorithm to receive and process signals from the sensors and to perform automated cutting parameterization; and d) a CAD computer includes a data collection routine, said data collection routine receives data from said LVDT sensor, said linear potentiometer sensor and said through-beam photoelectric sensor, said data collection routine receives input from said LVDT sensor, said linear photoelectric sensor and said through-beam photoelectric sensor to define the kind of material and automatically set machine cutting parameters before performing a cutting operation without operator input.

2. The system according to claim 1, wherein during operation, when a lateral force is applied to a lateral side of the vibrating knife, and rollers secure the vibrating knife during vibration, the LVDT sensor detects a lateral deflection of the vibrating knife and provides a corresponding deflection signal to the PLC, which utilizes artificial intelligence, for determination of cutting parameters.

3. The system according to claim 1, wherein during operation, the linear potentiometer sensor, disposed parallel to longitudinal axis of the vibrating knife, follows a vertical movement of the vibrating knife as the vibrating knife is lowered towards a material spread, thereby generating a signal indicative of material spread height, the signal being provided to the PLC, which utilizes artificial intelligence, for determination of cutting parameters.

4. The system according to claim 1, wherein during operation, variations of light beams emitted by an emitter, and received by a receiver, as the light beams cross a new or used vibrating knife, are received by the receiver and are detected by the through-beam photoelectric sensor, wherein the variations are indicative of a varying vibrating knife width, wherein a corresponding signal is provided to the PLC, which utilizes artificial intelligence, for determination of cutting parameters.

5. The method of automated parameterization for a vibrating knife cutting machine using the system according to claim 1, wherein the method further comprises the steps of:

a) launching, by a CAD computer, a data collection routine by transmitting to the PLC commands to collect data of a material spread to be cut;

b) actuating, by the PLC having an artificial intelligence component, an actuator that controls the vibrating knife to lower into the material spread, during which the sensors generate and transmit signals to the PLC; and c) determining, by the PLC, cutting parameters based at least on the transmitted signals, and transmitting the cutting parameters to the CAD computer, thereby automating the parameterization.

6. The system according to claim 1, wherein said data collection routine assesses and modifies the machine parameters in the best way, thus making the knife to follow its path in the material in a more accurate way.

7. The system according to claim 1, wherein a spread height and a stiffness of the material to be cut is determined from input from said LVDT sensor, said linear potentiometer sensor and said through-beam photoelectric sensor as sensed through said vibrating knife.

* * * * *